Sept. 8, 1959   G. B. RICHARDS   2,903,025
LIQUID FLOW CONTROL APPARATUS
Filed April 3, 1957   4 Sheets-Sheet 1

INVENTOR.
GEORGE B. RICHARDS
BY
ATTORNEYS

Sept. 8, 1959 G. B. RICHARDS 2,903,025
LIQUID FLOW CONTROL APPARATUS
Filed April 3, 1957 4 Sheets-Sheet 2

INVENTOR.
GEORGE B. RICHARDS
BY
ATTORNEYS

Sept. 8, 1959  G. B. RICHARDS  2,903,025
LIQUID FLOW CONTROL APPARATUS
Filed April 3, 1957  4 Sheets-Sheet 3

INVENTOR.
George B. Richards
BY Fidler, Crouse &
Beardsley
Attorneys

Sept. 8, 1959

G. B. RICHARDS 2,903,025

LIQUID FLOW CONTROL APPARATUS

Filed April 3, 1957

INVENTOR.
George B. Richards
BY Fidler, Crouse &
Beardsley
Attorneys

United States Patent Office

2,903,025
Patented Sept. 8, 1959

2,903,025

LIQUID FLOW CONTROL APPARATUS

George B. Richards, Deerfield, Ill., assignor to Liquid Controls Corporation, North Chicago, Ill., a corporation of Illinois Application April 3, 1957, Serial No. 650,537

18 Claims. (Cl. 141—217)

This invention relates to liquid flow control apparatus and has to do more particularly with apparatus for controlling liquid flow into a container, the apparatus automatically terminating flow when the liquid in the container being filled reaches a predetermined level.

Liquid flow control apparatus as it is commonly employed in filling nozzles is adapted to be opened manually and retained in open position during filling and then closed automatically when the container has been filled to a predetermined level. Such apparatus as heretofore constructed has been arranged to be held in open position by mechanical means, such as a latching mechanism, which is released by vacuum established within the nozzle by liquid flow therethrough. If the latch should stick, or if the liquid flow should be too low to produce the necessary vacuum, the apparatus does not terminate flow when the container is filled to the predetermined level. Such apparatus does not "fail safe," that is, it does not close, or terminate flow, in the event of either of these common failures. The Underwriters' Laboratories and varous state and municipal fire prevention authorities do not approve such prior control apparatus for the reason that they generally are not considered safe. Some of the reasons such apparatus is unsafe are set forth hereinafter. Prior control apparatus which is mechanically latched open employs linkages which involve friction of a variable extent. Such linkages are exposed and thus subject to distortion, freezing and other adverse conditions. The diaphragm or section which is actuated by the vacuum is called upon to do mechanical work in addition to hydraulic work. For example, under conditions of low flow of the liquid, insufficient vacuum is developed to close the valve means thereof. Moreover, these mechanisms involve a so-called instantaneous closure action which is disadvantageous hydraulically because of the consequent shock or "water hammer."

Many prior flow control mechanisms are provided with means for latching a valve in open position, which means is of such construction that after the liquid has reached the level at which the latching means is released, the latching means must be held manually in latching position in order to permit the valve to be held in open position for completion of the filling of the tank, or "topping off" the tank.

An object of the invention is to provide new and improved flow control apparatus for use in filling containers wherein the apparatus terminates flow automatically when the liquid in the container being filled reaches a predetermined level.

Another object is to provide liquid flow control apparatus for filling containers wherein the apparatus is opened manually, is held in open position solely by the flow of liquid, and is automatically closed when the liquid in the container being filled reaches a predetermined level.

Another object is to provide liquid flow control apparatus for use in filling containers which automatically closes when the liquid in the container being filled reaches a predetermined level, which apparatus is extremely simple in construction and has a minimum of moving parts.

Still another object is to provide liquid flow control apparatus for use in filling containers which automatically closes when the liquid in the container being filled reaches a predetermined level, which apparatus is free of any mechanical means, such as latches, for holding the apparatus in open, or liquid flow, position.

A further object is to provide liquid flow control apparatus for filling containers which automatically closes when the liquid in the container reaches a predetermined level, which apparatus is so constructed that it closes in the event of a reduced liquid flow.

Another object is to provide liquid flow control apparatus for filling containers which will terminate flow automatically if the supply of liquid is cut off or materially reduced.

Another object is to provide liquid flow control apparatus for use in filling containers which automatically closes when the liquid in the container being filled reaches a predetermined level and which is so constructed that it may be held open merely by holding in open position a lever which controls the initial opening of the apparatus.

It is a further object of the invention to provide improved liquid flow control apparatus including a vacuum line opening to the flowing liquid in which means are provided for minimizing the drawing of liquid into the vacuum line.

It is still another object of the invention to provide improved liquid flow control apparatus having a vacuum-controlled valve in which closing of said valve is not restrained by movement of a member through a packing gland.

A further object of the invention is to provide improved liquid flow control apparatus having a valve for terminating liquid flow into a container when the liquid within such container reaches a predetermined level, in which such valve may be arranged below said predetermined liquid level.

Other objects and advantages will appear from the following description taken in connection with the appended drawings, wherein.

Figure 1:
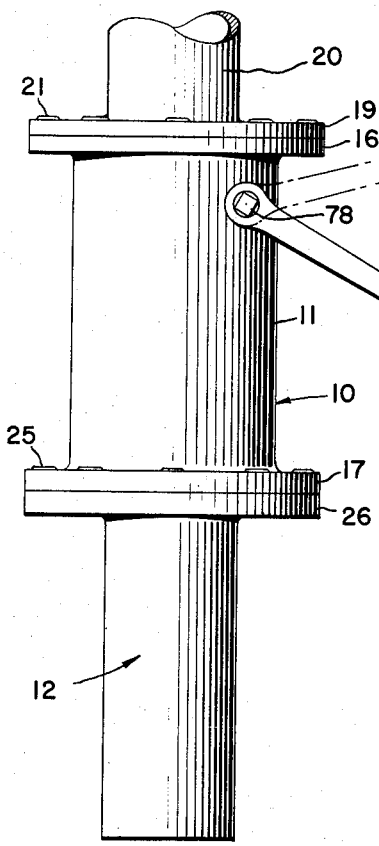
Figure 1 is a side elevational view of one embodiment of the invention.
Figure 3:
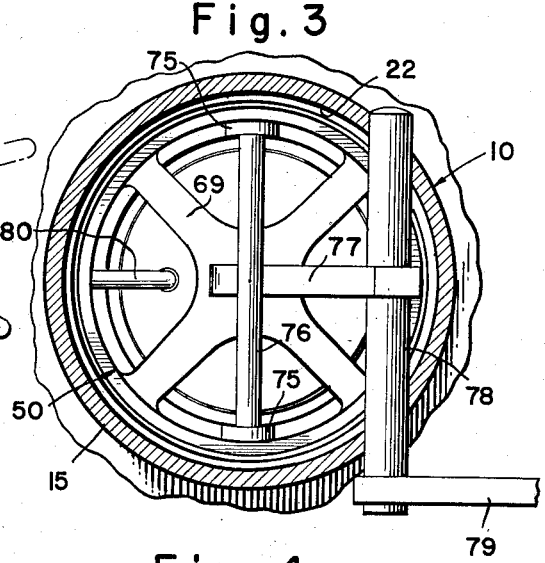
Fig. 3 is a transverse sectional view taken along the line 3—3 of Fig. 2.
Figure 4:
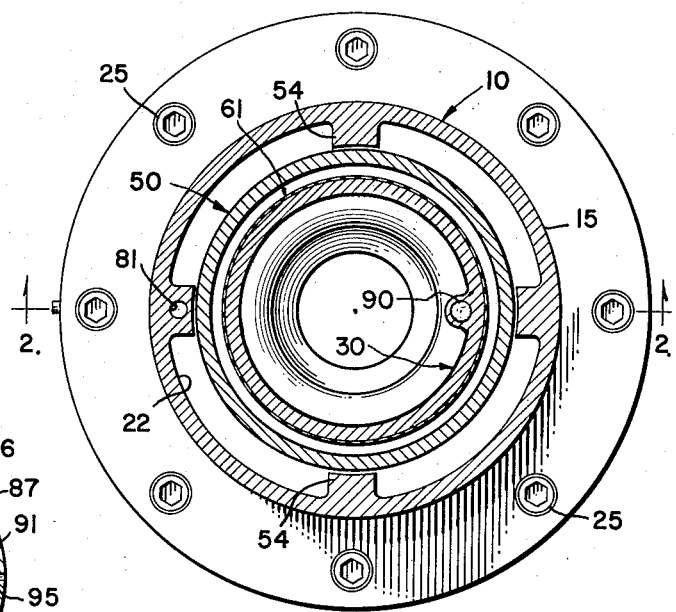
Fig. 4 is a transverse sectional view taken along line 4—4 of Fig. 2.
Figure 5:
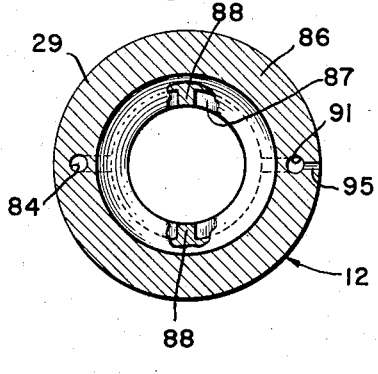
Fig. 5 is a transverse sectional view taken along line 5—5 of Fig. 2.

The invention finds one principal application in nozzles such as are customarily attached to the end of a flexible hose or pipe for dispensing liquids from a storage container to another container or receptacle, and the embodiment of the invention disclosed in Figs. 1–6 is well adapted to such an application. Such nozzles are customarily employed in transferring liquids, such as gasoline, from storage tanks to vehicles, or from shipping vehicles, such as tank trucks or tank cars, to other vehicles or to storage tanks.

The apparatus of Figs. 1–6 includes a casing or housing 10 defining a chamber having a valve housing section 11 and an outlet or nozzle section 12. The housing section 11 may be formed in any suitable manner, and preferably it is formed by a tubular rigid member 15 having end flanges 16 and 17. The end flange 16 is provided with openings 18 whereby the apparatus of the invention may be connected to a flange 19 on a hose or pipe 20, as by screws 21.

The housing section 11 is secured as by screws 25 to a flange portion 26 of the outlet section 12 which includes a tubular portion 29 depending from the flange portion 26 and defining an outlet compartment 23. The housing section 11 defines a valve compartment 22 and is open at both ends for the flow of liquid therethrough from the pipe 20 to the outlet compartment 23.

A seal is provided between the flange 17 and the flange 26, which seal preferably takes the form of an O ring 27 seated in a V-shaped groove 28 formed at the juncture of the flanges 17 and 26 and a valve seat member 30, hereinafter described. At this point it should be understood that the O ring 27 and the other O rings hereinafter mentioned are made of suitable resilient sealing material which is inert to the liquid with which the valve device is used.

The valve seat member 30 is disposed in the valve compartment 22 and has a flange portion 31, the peripheral portion of which is clamped between the flanges 17 and 26. Formed in the flange portion 31 and an outlet orifice 32 opening into the outlet section 12.

The valve seat member 30 is formed with an upstanding tubular portion 40 in which is provided a plurality of (for example, four) circumferentially spaced outlet ports 41 which provide communication between the valve compartment 22 and the outlet orifice 32. Extending across and closing the upper end of the upstanding portion 40 and disposed in alignment with the orifice 32 is an end wall 42.

A valve member 50 of generally cupped form is supported for sliding movement over the cylindrical portion 40 of the valve seat member 30 between a position (shown in full lines in Fig. 2) exposing the ports 41 and a position (indicated by broken lines in Fig. 2) closing the ports 41. The valve member 50 is formed with a cylindrical portion 51 which is telescoped over the cylindrical portion 40, the member 50 being open at its "inner" end (lower end as viewed in Fig. 2) for this purpose. Secured in the cylindrical portion 51 intermediate the ends thereof is a partition 52 which, in the illustrated embodiment, serves both as a portion of the valve member 50 and also as a valve-actuating element.

The valve member 30 is positioned in the compartment 22 coaxially therewith and with the cylindrical portion 40 of the valve seat member by a plurality of (preferably four) elongated rib-like bosses or guides 54. The guides extend longitudinally along and in circumferentially spaced relation around the inner wall of the casing member 15 and preferably are integral therewith. The guides maintain the valve member 50 in spaced relation to both the walls of the casing member 15 and the valve seat member 30.

Figure 2:
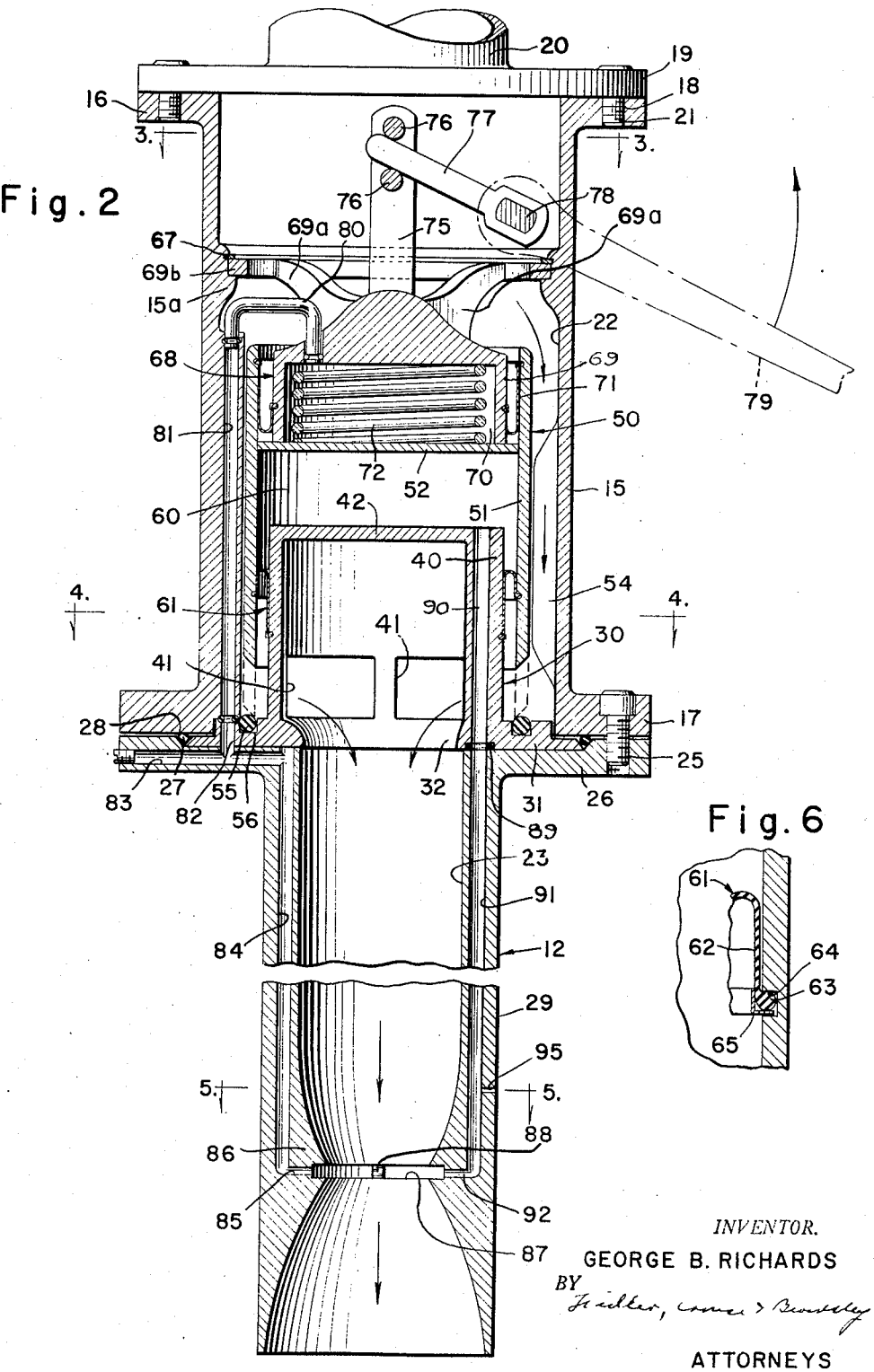
Fig. 2 is an enlarged, longitudinal sectional view of the apparatus of Fig. 1.
Figure 6:
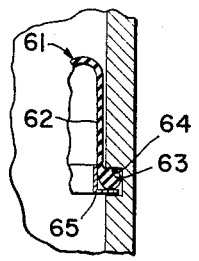
Fig. 6 is an enlarged, fragmentary detail view of a portion of the same apparatus, viewed as in Fig. 2.

A seal is provided against which the inner end of the valve member 50 seats when in position closing the ports 41. Preferably the seal is formed by an O ring 55 disposed in a circular groove 56 formed in the exposed face of the flange 31. The inner end of the valve member 50 preferably is inclined or beveled as seen in Fig. 2 for tight sealing engagement with the O ring 55.

The valve member 50 and the valve seat member 30 together define a compartment 60 which, for reasons which will hereinafter appear, is designated as the "releasing" compartment. A seal 61 is provided for sealingly closing the clearance space between the cylindrical portions 40 and 51. The seal 61 is so formed as to permit the necessary movement of the valve member 50 relative to the valve seat member 30. Preferably, the seal, shown more in detail in Fig. 6, includes a sleeve 62 of flexible, resilient, liquid-impervious material which is inert to the liquid with which the apparatus is to be used. The sleeve 62 is formed at its end with beads 63 (one of which is shown) which are disposed in appropriately located grooves 64 in the valve member 50 and valve seat member 30 respectively. The beads 63 are secured in the respective grooves by retainers 65 each of which is of circular form and of L-shaped cross section.

The upper end of the cylindrical portion 51 of the valve member 50 is slidable over a cup member 68 fixed in the valve chamber 22, the upper wall of which is shaped to aid in the streamline flow of the liquid. The cup member includes a body portion 69 and a supporting portion integral therewith and including a plurality of legs 69a projecting upwardly from the body and a mounting ring 69b. The mounting ring 69b is seated on a shoulder formed on a flange 15a on the inner wall of the housing member 15 and is secured thereon by a clamp ring 67 sprung into a groove above the shoulder. The cup member 68 and the valve member 50 define a compartment 70 which, for reasons which will appear hereinafter, is designated as the "holding" compartment. The holding compartment 70 is closed off from the valve compartment 22 in all positions of the valve member 50. Such closure is provided by a seal 71 similar in form to the seal 61 and including a sleeve connected at its ends respectively to the valve member 50 and the cup member 68.

It will be seen that the valve member 50, the valve seat member 30, the cup member 68 and the two seals 61 and 71, together define a chamber having the two compartments 60 and 70.

Disposed in the holding compartment 70 is a valve closing spring 72 which seats at one end against the end wall of the cup member 68 and bears at the other end against the actuating element 52. The spring normally causes the valve actuating element 52 to urge the valve member 50 toward its closed position and hold it closed except when the valve member is moved to open position and held therein as hereinafter explained.

The valve member 50 is provided with a pair of diametrically spaced ears 75 extending from the upper end of the cylindrical portion 51 between which ears extend spaced rods 76. An operating lever 77 is carried on a shaft 78 journaled in the casing member 15 and at its free end extends between the rods 76 whereby, upon rotation of the lever 77, the valve member 50 is moved in a corresponding direction. The shaft 78 projects from the casing 10 and carried on the projecting portion (Fig. 1) and on the outside of the valve housing 11 is a manual operating lever or handle 79. It will be seen that upon appropriate rotation of the handle 79 from the position shown in broken lines in Fig. 1 to the position in full lines (Fig. 1) the valve member 50 is moved from its closed position (indicated in broken lines in Fig. 2) to its open position (indicated in full lines in Fig. 2). The opening of the valve 50, that is, the movement from its closed to open position, is effected by moving the valve against the force of the closing spring 72.

In accordance with the present invention, means are provided for holding the valve 50 in an open position, so long as liquid is flowing through the valve at a substantial rate, until the liquid in the container being filled reaches a predetermined level relative to the valve, whereupon the holding means is rendered ineffective to hold the valve open and the valve is automatically closed by the force of the closing spring.

To this end a passage is provided leading from the holding compartment 70 to the outlet compartment 23. Owing to the vacuum drawn on the end of such passage by the venturi effect of the liquid flowing past the end of the passage, a vacuum is created in the holding compartment 70. The passage preferably is provided by a pipe 80 sealingly connected at one end to the cup member 68 and opening into the compartment 70. At its other end the pipe 80 is sealingly connected to a bore 81 formed in one of the guides 54, which bore communicates with an aligned bore 82 leading to a transverse bore 83 in the flange 26 of the outlet section 12 which in turn connects with a longitudinal bore 84. The bore 84 leads to a short transverse bore 85 which opens into the outlet compartment 23 at a point spaced from the end of the casing section 12. Preferably the wall of the tubular portion 29 is formed with a thickened section 86 providing a restricted internal diameter at the portion where the passage 85 opens into the outlet compartment 23 thereby increasing the venturi effect. An inwardly opening, annular groove 87 is formed in the thickened section 86, into which groove the bore 85 opens. The groove 87 serves to cause the creation of a greater vacuum in the bore 85 when liquid is flowing through the valve than would be created if the bore 85 opened directly into the compartment 23.

It will now be seen that when the valve member 50 is in its open position and liquid is flowing through the valve casing, the vacuum caused by the venturi effect at the orifice of the bore 85 creates a vacuum in the compartment 70 which holds the valve actuating element 52 in position to maintain the valve member 50 in open position against the closing force of the spring, provided that the air in the compartment 60 is at atmospheric pressure or substantially atmospheric pressure.

The air in the compartment 60 is normally maintained at atmospheric pressure or substantially atmospheric pressure by means now to be described. This means includes a bore 90 extending in a vertical boss in the valve seat member 30 and opening at its upper end into the compartment 60, and at the other end into a bore 91 extending longitudinally in the casing portion 29. An O ring 89 is provided at the juncture of the bores 90 and 91 to seal the joint. The bore 91 is connected to a transverse bore 92 in the thickened wall portion 86 and opening into the compartment 23 at the groove 87. A spoiler orifice 95 extends from the bore 91 above the bore 92 and opens to the exterior of the casing portiion 29.

A pair of partitions 88, preferably disposed at diametrically opposite locations, is provided, such partitions being located in the grooves 87 at a point respectively between the bore 85 and the bore 92. The partitions 88 thus serve to prevent the spoiler means from partially spoiling the vacuum in the passages leading from the holding compartment 70 as will appear from the following description.

In the use of the device of my invention, it is connected to a hose or pipe leading from the container (not shown) to be discharged and the outlet portion 12 is inserted in the container (not shown) to be filled. The container to be filled of course is vented in the usual manner to permit the ingress of liquid from the valve or nozzle. The valve is disposed in the filling opening of the container (not shown) to be filled in a predetermined relation therewith, that is to say, the valve is located at a predetermined elevation relative to the container. Preferably this is accomplished by resting the lower face of the flange 26 on the rim of the filling opening of the container to be filled, thereby ensuring the predetermined positioning of the valve relative to the container and, more particularly, ensuring the placement of the spoiler orifice at a predetermined elevation within the container. The valve is opened by rotating the handle 79 in a clockwise direction (as viewed in Fig. 1) to thereby rotate the lever 77 and raise the valve 50 to its open position.

The liquid then flows through the valve and into the container and, shortly after such flow is established, the suction created by the flow of the liquid results in the establishment of a vacuum or negative pressure in the conduit or passage defined by the pipe 80, the bore 81, the bore 83, the bore 84 and the bore 85, which vacuum is established in the compartment 70. At this time, since the spoiler orifice 95 is open to atmosphere, the pressure in the releasing compartment 60 is at atmospheric or substantially atmospheric pressure. As explained above, the force of the vacuum created in the chamber 70 exceeds the force exerted by the spring 62 tending to cause the valve actuating element 52 to move the valve member 50 to closed position and thereby holds the valve member 50 in open position so long as atmospheric pressure is maintained in the compartment 60. In other words, considering the forces involved (and neglecting the weight of the valve member 50 and any frictional forces, neither of which is substantial), the upward thrust on the valve member resulting from the differences in absolute pressures in the compartments 60 and 70 respectively is greater than the downward thrust created by the spring 72 when the spoiler orifice is uncovered.

The flow of liquid past the inner end of the bore 92 creates a vacuum in this passage. However, since the spoiler orifice 95 is connected to atmosphere, no material vacuum is drawn on the compartment 60 and the air pressure therein remains at or close to atmospheric.

The user need not effect any further manipulation of the valve but can leave the valve unattended and the liquid will continue to flow through the valve and into the container until the level of the liquid rises to a point wherein it closes the spoiler orifice 95. When this occurs, air can no longer flow into the bore 91 through the spoiler orifice 95, with the result that a vacuum is then established in the passage leading from the compartment 60 (in a manner similar to the vacuum in the passage leading from the compartment 70), and a vacuum is thereupon established within the chamber 60 which is equal or close to the vacuum in the compartment 70. The spoiler orifice 95 is of such size that it permits sufficient flow of air therethrough to spoil the vacuum in the bore 91 effectively but will not permit sufficient flow of liquid therethrough to spoil the vacuum effectively, all as is, in itself, well known in the art. When this occurs, the air pressures on the two sides of the valve actuating element 52 are equal and there is no force opposing the force of the spring against the valve member 50. Accordingly, the valve member 50 is moved by the spring 72 toward closed position. The closing of the valve of course halts the further flow of liquid through the valve and into the container so that filling of the container is halted at a level at the height of the upper edge of the spoiler orifice 95.

The construction of the apparatus of Figs. 1–6 is such as to automatically limit the rate of closing of the valve and prevent the valve from closing too rapidly so that it does not slam shut when it moves toward closed position. As explained above, the closing force of the spring, which is constant for any position of the valve (and does not vary greatly throughout the range of expansion of the spring) is opposed by the difference in air pressures in the compartments 60 and 70. Thus the rate of closing of the valve depends upon the rate at which the difference in air pressures varies when the spoiler orifice is closed. This in turn depends upon the rate at which a vacuum is produced in the compartment 60. Since such vacuum is not produced instantaneously, the valve is not urged shut instantly but at a rate corresponding to the rate at which a vacuum is created in the compartment 60. The apparatus is so designed as to prevent undesirably rapid closing of the valve.

It will be seen that the above described embodiment of the invention is fully automatic in its closing action so that it is not necessary for the operator to attend the filling operation. The only operation that is necessary on the part of the user is to insert the outlet end of the apparatus in the container and adjust it to the desired level, as by resting the under face of the flange 26 on the rim of the filling opening and then rotating the handle 79 to open the valve and holding the handle in this position for a few seconds until the necessary vacuum is established in the compartment 70 to hold the valve open. Thereafter the valve is held open by the vacuum established in the compartment 70 and remains open until such time as the liquid level rises to close the spoiler orifice 95. When this occurs the valve is automatically closed mechanically by the spring 72 and there is no necessity for the operator to perform any operation to close the valve. It is not necessary for the operator to manipulate any latching or locking device for holding the valve in open position as is the case in filling valves of prior art construction.

It will be seen from the foregoing that should the liquid flow be reduced to the point that it is not capable of creating an effective vacuum (the valve tripping force in prior art apparatus), the valve will close or "fail safe."

It will be noted that the area of the wall 52 on both sides thereof, that is, the areas exposed to the compartments 60 and 70 are substantially equal and thus the pressures on the opposite sides of the wall 52 are substantially equal and the entire force of the spring 72 is effective against the valve 50 to close it. However, the arrangement is such that if at any time the pressure in the compartment 60 falls below atmospheric pressure the vacuum in the compartment 70 is insufficient to maintain the valve 50 in its open position against the force of the spring 72 and the valve is closed.

The apparatus described above and shown in Figs. 1-6 lends itself excellently to a "topping off" operation. In apparatus of the prior art construction it is necessary for the operator to manipulate the latching arrangement to open the valve and to release the latching arrangement frequently during the topping off operation. In the present case, the topping off operation may be performed by merely manipulating the handle to hold the valve open for a sufficient period to fill the container to the desired extent, whereafter the operator merely releases the handle and the valve is automatically closed.

The apparatus of Figs. 1-6 is extremely simple in construction and has a minimum of moving parts. Accordingly, it may be made relatively inexpensively, and at the same time is less subject to malfunctioning than apparatus of a more complicated construction and having a greater number of moving parts. It may be made in various sizes in accordance with the requirements of a particular application without any material changes in design.

Figure 7:
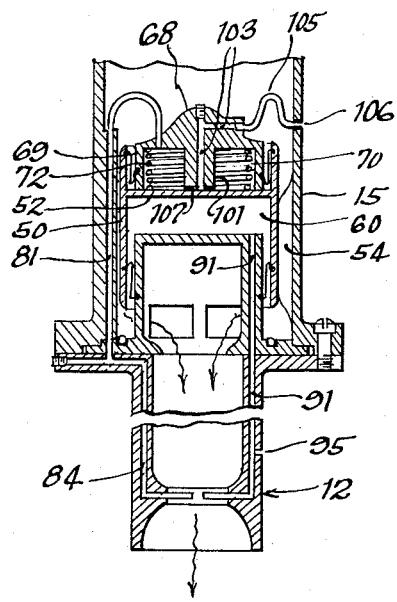
Fig. 7 is a cross-sectional view similar to Fig. 2 but showing a modified form of the apparatus of Figs. 1–6.

In Fig. 7 a modification of the apparatus of Figs. 1-6 is shown. This modification is identical in most of its parts with the embodiment of Figs. 1-6, and a description of like parts, designated by like reference numerals, is not repeated with respect to Fig. 7. The operating handle and associated parts have been omitted from the showing of this modification in the interest of simplicity and clarity.

The cup member 68 of the modification shown in Fig. 7 differs from the similar member of Figs. 1-6 in that it includes a central stud 101 which extends downwardly substantially to the plane defined by the lower edges of the body portion 69 of the cup member. A passage 103 extends from the lower surface of the stud 101 upwardly and then to one side of the cup member 68 as shown and is extended by a tube 105 through the wall 15. A small port 106 is provided at the outer end of the tube 105. Atmospheric pressure is thereby brought through the port 106, the tube 105, and the passage 103, to the lower face of the stud 101.

This lower face of the stud 101 is preferably ringed by a gasket 107 of soft material such as neoprene such that a tight seal may be effected between the stud 101 and the partition 52 of the valve member 50 when the valve member is in its raised or open position. The gasket 107 has a central opening therethrough such that the compartment 70 may be connected to the atmosphere when the valve member 50 drops, but is sealed off from the outer atmosphere when the valve member is in its fully raised position.

With the valve member in its fully raised or open position the forces applied to the valve member are the same as in the first described embodiment of Figs. 1-6. More particularly there is a vacuum in the compartment 70 and there is substantially atmospheric pressure in the compartment 60. However, when liquid rises to the level of the spoiler orifice 95 and the resultant vacuum in the compartment 60 permits the spring 72 to start downwardly or closing movement of the valve member 50, the compartment 70 becomes connected to the outer atmosphere through the passage 103, the tube 105 and the port 106 such that the vacuum in the compartment 70 is spoiled.

An important result of this spoiling of the vacuum in the compartment 70 is that it eliminates the possibility of liquid being drawn up through the bores 84 and 81 into the compartment 70. It should be noted that without this connection of the compartment 70 to the atmosphere, downward movement of the valve 50 by the spring 72 tends to create a lower pressure in the compartment 70 than would normally exist, with the result that liquid may be brought up through these bores and into the chamber. Opening of the compartment 70 to atmosphere avoids this objectionable result. In spite of the fact that the entrance of air into the compartment 70 makes for more rapid closing of the valve, the valve member 50 will still not slam shut since its downward movement must be accompanied by the escape of air from the compartment 60 through the bore 91.

The embodiment of the invention illustrated in Figs. 8-11, while it operates on the same principle as do the embodiments of Figs. 1-7 differs therefrom in various respects as explained below. The apparatus includes a housing 111 defining a chamber providing passage for liquid flow entering at the right in Fig. 8 and exhausting from the left. Arranged within the housing 111 is a valve seat 112 and arranged thereabove, or on the inlet side thereof, is a valve 113 of the poppet type. The valve member 113 includes a valve stem 114 extending slidably through the upper wall of the housing 111. A spring 115 urges the valve member 113 downwardly or toward its closed position with respect to the valve seat 112. The valve member may be moved to its open position by a handle 116 pivotally mounted on the housing 111 as shown. The handle 116 is arranged to bear upwardly against a push rod 118 which extends slidably through a packing gland 117 arranged in the lower wall of the housing 111, and its upper end is arranged slidably within a guide tube 119 secured to the bottom of the valve member 113. A spring 120 engages a plate 121 secured to the push rod 118 and thereby urges the push rod and handle 116 downwardly.

It will readily be understood that raising of the handle 116 drives the push rod 118 upwardly and that the latter will engage the valve member 113 and raise it to its open position. The valve member is maintained in its open position by means described below, but when the handle 116 is released, the handle and the push rod 118 are returned to their normal positions by the spring 120. The simple abutment of the push rod 118 and the valve member 113 permits this return of the manual control apparatus to normal position while the valve member remains in its open position, with the result that when the valve member 113 is returned automatically to its closed position by means described below, it need not work against a load in the form of manual control apparatus and in particular it need not drive the push rod 118 through the packing gland 117.

Arranged directly over the valve parts and outside the housing 111 is a dome 122 which defines with the upper wall of the housing 111 an hermetically sealed chamber. A flexible diaphragm 123 is arranged within this chamber and divides it into an upper compartment 124 and a lower compartment 125. The central portion of the diaphragm 123 is secured to the upper end of the valve stem 114 by any suitable means such that there is necessarily simultaneous movement of the valve 113 and the diaphragm 123.

A tube 131 opens at one end into an annular recess 132 adjacent the lefthand end of the housing 111 such that the flow of liquid through the housing tends to create a vacuum in the tube 131. As in the case of the previously described embodiments the annular recess 132 is arranged in a narrowed passage 133 within the housing whereby the resulting higher speed of liquid flow produces a higher vacuum in the tube 131 than would otherwise be the case.

The other end of the tube 131 passes outwardly through the housing 111 and leads to the compartment 124 above the diaphragm 123. An orifice 135 also leads to the compartment 124 and serves to connect this compartment with the atmosphere. However, the orifice 135 is arranged immediately above the valve stem 114 with the result that when the valve member 113, the valve stem 114, and the diaphragm 123 are raised to the full open position by operation of the handle 116, the diaphragm seals off the orifice 135. Subsequent passage of liquid through the housing 111 and past the annular recess 132 draws a vacuum in the tube 131 and hence in the upper compartment 124. This holds the diaphragm 123 in raised position wherein it seals the orifice 135 and maintains the valve member 113 in its full open position.

Figure 8:
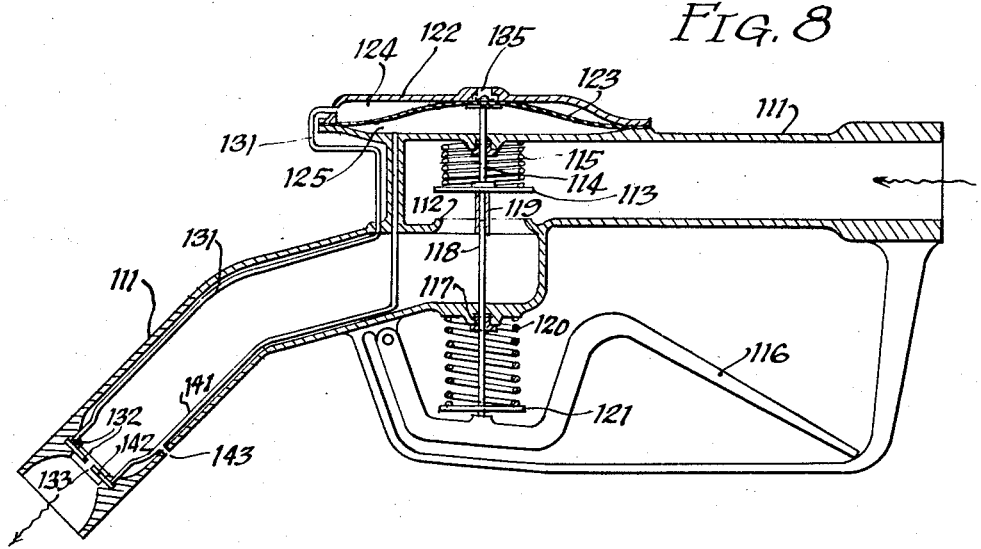
Fig. 8 is a cross-sectional view of another embodiment of the invention.
Figure 9:
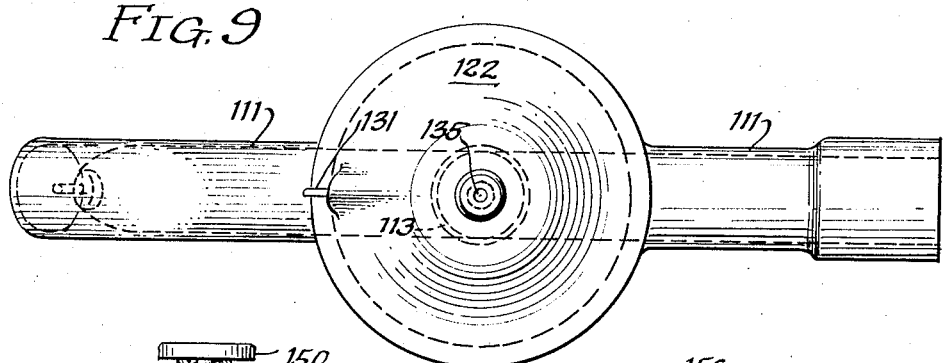
Fig. 9 is a plan view of the apparatus of Fig. 8.

A second tube 141 opens at its lower end into an annular recess 142 immediately opposite the annular recess 132. It will be noted that the two recesses 132 and 142 are substantially semi-circular but do not meet at their opposed ends, as in the previously described embodiments. The other end of the tube 141 extends through a wall of the housing 111 and into the lower compartment 125. Even though there is substantial fluid flow through the housing 111 the pressure within the tube 141 and hence within the compartment 125 is substantially equal to atmospheric pressure since a spoiler orifice 143 is provided in the tube 141 near its lower or lefthand end, as seen in Fig. 8. However, when the liquid level in the container being filled reaches the height of the spoiler orifice 143, a vacuum is produced within the line 141. This results from the fact that the spoiler orifice is of such size that it may pass sufficient air to spoil the vacuum in the line 141 effectively and at the same time will not pass sufficient liquid to spoil the vacuum effectively.

The resulting vacuum in the line 141 creates a like vacuum in the compartment 125 with the result that the pressures on opposite sides of the diaphragm 123 become substantially equal. The spring 115 may then initiate downward movement of the valve member 113 and valve stem 114 and the diaphragm 123. Minute initial movement of the diaphragm opens the orifice 135 and permits the entrance of air therethrough into the compartment 124. As in the case of the previously described embodiment illustrated in Fig. 7, this prevents the suction of liquid up through the tube 131 and into the chamber 124. It permits a more rapid closing of the valve, but the valve is nevertheless prevented from slamming shut since air within the compartment 125 must be driven out through the tube 141.

Figure 10:
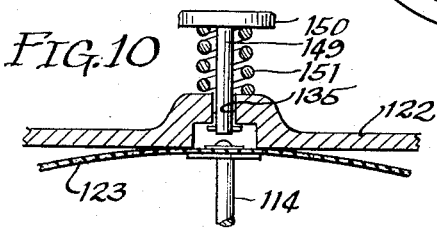
Fig. 10 is a detail cross-sectional view of a control element which may be employed with the apparatus of Fig. 8.

If desired, the orifice 135 may loosely receive a shaft 149 having a button 150, preferably biased upwardly by a spring 151, all as shown in Fig. 10. Manual depression of the button 150 may force the diaphragm 123 downwardly such that air at atmospheric pressure may enter the compartment 124, the shaft fitting loosely in the orifice 135 as stated above to permit passage of air therearound. This provides a ready release for the valve should it be desired to terminate the flow prior to the filling of the container to the level of the spoiler orifice 143.

Figure 11:
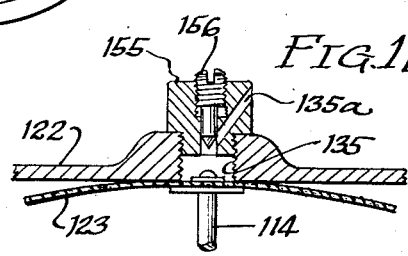
Fig. 11 is a detail cross-sectional view of another control element which may be employed with the apparatus of Fig. 8.

In Fig. 11 the orifice 135 is shown provided with a plug 155. This plug has an orifice or passage 135a, and includes an adjustable member 156 for adjusting the resistance to the passage of air, all as is well understood in the art. Adjustment of the member 156 by controlling the resistance to the passage of air through the orifice controls the speed with which the valve member 113 may close.

It will be seen that the embodiments of the invention disclosed in Figs. 8-11 are of somewhat simpler construction than the embodiments of Figs. 1-7. In addition a lost motion or simple abutting connection is provided between the valve 113 and push rod 118, whereby the latter may be drawn back through its packing gland 117 under the influence of the spring 120 while the valve member 113 remains in open position. Accordingly when the valve member subsequently moves automatically toward its closed position the forces acting thereon are not resisted by the friction of movement of the push rod 118 through its packing gland.

Figure 12:
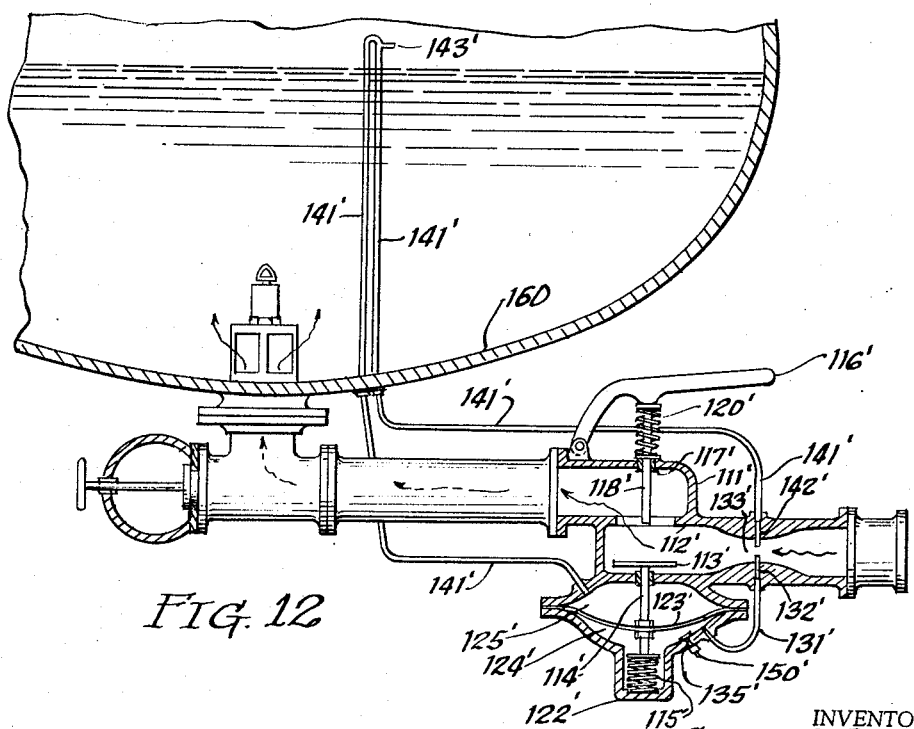
Fig. 12 is a cross-sectional view of apparatus similar to that shown in Fig. 8 employed in a different application.

The embodiment of the invention disclosed in Fig. 12 is substantially identical in operation to the embodiment of Fig. 8. While the component parts of the two embodiments differ slightly in their construction and relative arrangement they are substantially the same and accordingly are designated by like reference numerals with a prime mark (') affixed. Only the more significant differences in arrangement are described below.

It will be noted that the housing 111' is substantially different in shape than the housing 111 of Fig. 8 and that the entire assembly is inverted with respect to Fig. 8. The valve spring 115' rather than being arranged immediately adjacent the valve 113' as in Fig. 8 is arranged outside the housing 111' and on the outer side of the diaphragm 123', a recess being provided in the dome 122' for receiving this spring. The orifice 135' is displaced to one side of the center of the dome and is not covered by the diaphragm 123' at any time. In this illustrated embodiment of the invention the orifice 135' and the button 150' serve only as a manual valve release, the button assembly normally sealing the orifice in a manner well known in the art and being manually depressible to admit air to the compartment 124' to close the valve. Still further the annular recesses 132' and 142' into which the tubes 131' and 141' open are arranged upstream of the valve proper rather than downstream thereof as in Fig. 8. The operation of all these parts, with the exception of the orifice 135' and button 150' is the same as in the embodiment disclosed in Fig. 8.

The embodiment of Fig. 12 is, however, employed in a different application than is the embodiment in Fig. 8. In the latter case the apparatus is intended to fill a container from the top. More specifically the left-hand end of the housing 111 serves as a nozzle to be inserted freely into an opening in the container to be filled, for example the filling spout of the gasoline tank of an automobile. When the liquid level in the container being filled reaches the spoiler orifice 143 the flow of liquid is terminated in the manner described above. As opposed to this, the embodiment of Fig. 12 may be employed to fill a container from the bottom and accordingly is particularly applicable to the filling of elevated stationary tanks or the tanks of liquid transporting trucks. In the latter case the liquid flow control apparatus may well be permanently attached to the truck as an accessory, the pipe or hose for supplying liquid thereto being releasably attached to the liquid flow control apparatus, for example at the right-hand end of the apparatus of Fig. 12.

The essential difference in the liquid flow control apparatus making it adaptable to this application is the arrangement of the vacuum tube 141' in such position, substantially above the major portion of the control apparatus, that the spoiler orifice 143' is at the intended level to which the container is to be filled. In Fig. 12 it will be seen that the vacuum tube 141' extends from the annular recess 142' through a suitable liquid-tight connection in an elevated tank 160 and up to the height to which the tank is to be filled. The spoiler orifice 143' is therefore brought to the desired liquid level. The vacuum tube 141' then turns downwardly, extends through another suitable liquid-tight connection and opens into the compartment 125'.

It will be apparent that the valve 113', once opened by the manual control lever 116', will be held open by the vacuum in the compartment 124' created by the flow of liquid into the tank 160, and that it will close automatically when the liquid in the tank reaches the desired level and closes the spoiler orifice 143' such that a vacuum is created in the compartment 125'. The tube 141' preferably extends upwardly a short distance beyond the spoiler orifice level in order that any liquid drawn through the orifice will run down that length of tube which leads to the annular recess 142', rather than into the compartment 125'.

In each of the embodiments of the invention disclosed in the drawings and described above, certain important features of the invention are incorporated. In each case, for example, the valve is held open by means energized solely by the flow of liquid. Accordingly there is no latch to be released for automatic closing of the valve, and a substantially reduced flow will, of itself, automatically close the valve. In the embodiments of Figs. 8–11, and Fig. 12, the valve spring 115 (or 115') may be omitted if desired since there is a tendency for the valve to close. As soon as a vacuum is created in the compartment 125 or 125' substantially equal to that in the compartment 124 or 124', any resilience of the diaphragm urges the valve toward closed position. The flow of liquid through the valve also tends to cause closing movement. In the embodiment of Figs. 8–11 atmospheric pressure over the small area of the orifice 135 will assist in starting closing movement of the valve. Once this has occurred, air rushes into the compartment 124 and firmly closes the valve. Where it is stated herein that the valve is normally urged toward its closed position it is intended that it be interpreted thus broadly.

Apparatus constructed in accordance with the present invention may readily be arranged for adjustable flow. In the embodiments shown principally in Figs. 1 and 12 this may be accomplished by providing an adjustable stop (not shown) for limiting valve opening movement. In the embodiments shown in Figs. 7 and 8 an adjustable stop (not shown) may be employed but provisions must be made for sealing of the orifice 103 or 135 with the valve means only partially open. This may be accomplished by using a tube as the adjustable stop. The tube may extend through the orifice and be adjustable inwardly and outwardly. The inner end of the tube then forms both an adjustable stop and the orifice, whereby the orifice may be sealed by opening of the valve to the degree permitted by the stop.

The various illustrated embodiments of the invention may also be arranged to permit straight manual operation simply by providing a manually openable and closable vent whereby the compartment 60, 124, or 124' is connected to atmosphere. Where the embodiment of Fig. 7 or Fig. 8 is modified as suggested above by provision of an adjustable tube which serves both as an orifice 103 or 135 and an adjustable stop, the apparatus may be made adjustable to straight manual operation by permitting the tube to be moved outwardly a sufficient distance that the member 52 or diaphragm 123 will not bear against such tube when the valve is fully opened. Instead it bears against fixed orifice-defining means which are slotted to prevent sealing of the orifice by the member 52 or diaphragm 123.

It will be apparent that the invention may be varied in its physical embodiment without departing from the spirit of the invention, and it is desired, therefore, that the invention be limited only by the scope of the appended claims.

This application is a continuation-in-part of my application Serial No. 582,511, filed May 3, 1956, now abandoned. The invention having thus been described, what is claimed and desired to be secured by Letters Patent is:

1. A filling device comprising a casing having a first chamber with an inlet and an outlet, a valve seat in said first chamber having a port therein providing communication between said inlet and said outlet, a valve member movable between closed and open positions relative to said seat, spring means normally urging said valve member toward closed position, means energized solely by the vacuum created by the flow of liquid through said casing for holding said valve member in open position and including a second chamber, a first venturi in said first chamber and a passage connected to said first venturi and to said second chamber on one side of said valve member, and means actuated by the immersion of said valve casing in a liquid to a predetermined extent for creating a vacuum for substantially counterbalancing said first vacuum for releasing said valve member for movement toward closed position and including a second venturi in said first chamber and a passage connected to said second venturi and to said second chamber on the other side of said valve member.

2. A filling device comprising a casing having a first chamber with an inlet and an outlet, a seat in said first chamber having a port therethrough, a valve element movable in said casing between port-exposing and port-closing position, spring means urging said valve element toward port-closing position, holding means actuated by the flow of liquid through said casing for establishing a vacuum on said valve element in a direction opposing the closing force of said spring and including a second chamber, a first venturi in said first chamber and a first passage connected to said first venturi and to said second chamber on one side of said valve element, releasing means actuated by the flow of liquid through said casing for establishing a vacuum on said valve element in a direction aiding the force of said spring and including a second venturi in said first chamber and a passage connected to said second venturi and to said second chamber on the other side of said valve element, and means active except when said casing is immersed in a liquid to a predetermined extent for rendering said releasing means ineffective.

3. Apparatus for controlling liquid flow into a container comprising means defining a first chamber, valve means movable in said first chamber between a closed position and an open position and normally urged toward closed position, means for moving said valve means to open position to permit liquid flow therethrough, means defining a second chamber, pressure responsive means in said second chamber and connected to said valve means, means responsive to such liquid flow for applying a vacuum to one side of said pressure responsive means for holding said valve means in open position and including a first venturi in said first chamber and a passage connected to said first venturi and to said second chamber on said one side of said pressure responsive means, and means responsive to such liquid flow for applying a vacuum to the opposite side of said pressure responsive means for substantially counterbalancing the holding effect of said first mentioned flow responsive means and including a second venturi in said first chamber and a passage connected to said second venturi and to said second chamber on said opposite side of said pressure responsive means, said last mentioned flow responsive means including an orifice positionable within such container and opening from said second passage, said orifice permitting air to spoil said second mentioned vacuum until the liquid in said container covers said orifice.

4. Apparatus for controlling liquid flow into a container comprising valve means movable between a closed position and an open position and normally urged toward closed position, means for moving said valve means to open position to permit liquid flow therethrough, pressure responsive means connected to said valve means, means responsive to such liquid flow for applying a vacuum to one side of said pressure responsive means for holding said valve means in open position, means responsive to such liquid flow for applying a vacuum to the opposite side of said pressure responsive means for substantially counterbalancing the holding effect of said first mentioned flow responsive means, said last mentioned flow responsive means including an orifice positionable within such container and normally connected to atmosphere to permit air to spoil said second mentioned vacuum until the liquid in said container covers said orifice, and means defining a second orifice normally connected to atmosphere to permit air to spoil said first mentioned vaccum, said second orifice being closed by movement of said valve means to open position and being opened by initial closing movement of said valve means.

5. Apparatus for controlling liquid flow into a container comprising means defining a first chamber, valve means movable in said first chamber between a closed position and an open position and normally urged toward closed position, means for moving said valve means to open position to permit liquid flow therethrough, means energized solely by such liquid flow for creating a vacuum for holding said valve member in open position and including a second chamber, a first venturi in said first chamber and a passage connected to said first venturi and to said second chamber on said one side of said member, and means positionable within such container and actuated by the rising of such liquid above a predetermined point thereon for creating a vacuum for substantially counterbalancing said first vacuum for releasing said valve means for movement toward closed position and including a second venturi in said first chamber, a passage connected to said second venturi and to said second chamber on the other side of said member and a spoiler orifice opening from said second passage, said means for opening said valve means being independently and automatically returnable at least to a position corresponding to the closed position of said valve means whereby closing of said valve means upon deenergization of said holding means is independent of said opening means.

6. The liquid flow control apparatus of claim 3 in combination with manually operable means for admitting air to said one side of said pressure responsive means.

7. The liquid flow control apparatus of claim 4 in combination with manually operable means for initiating closing movement of said valve means and thereby opening said second orifice.

8. Apparatus for controlling liquid flow into a container comprising a conduit having an outlet end insertable within such container, valve means within said conduit movable between a closed position and an open position and normally urged toward closed position, means for moving said valve means to open position to permit liquid flow through said conduit, means defining a chamber, pressure responsive means in said chamber and connected to said valve means, means responsive to liquid flow through said conduit for applying a vacuum to one side of said pressure responsive means for holding said valve means in open position and including a first venturi in said conduit and a passage connected to said first venturi and to said chamber, and means responsive to such liquid flow for applying a vacuum to the opposite side of said pressure responsive means for substantially counterbalancing the holding effect of said first mentioned flow responsive means, said last mentioned flow responsive means including a second venturi in said conduit and a passage connected to said second venturi and to said chamber, and having an orifice in said conduit adjacent the outlet end of said conduit and normally connected to atmosphere to permit air to spoil said second mentioned vacuum until the liquid in said container covers said orifice.

9. Apparatus for controlling liquid flow into a container comprising valve means movable between a closed position and an open position and normally urged toward closed position, means for moving said valve means to open position to permit liquid flow therethrough, means including said valve means defining a sealed chamber, a rigid plate secured to said valve means and dividing said chamber into two compartments, said plate being movable within said chamber in response to differential pressures in said compartments, means responsive to such liquid flow for applying a vacuum to one of said compartments for holding said valve means in open position, and means responsive to such liquid flow for applying a vacuum to the other of said compartments for substantially counterbalancing the holding effect of said first mentioned flow responsive means, said last mentioned flow responsive means including an orifice positionable within such container and normally connected to atmosphere to permit air to spoil said second mentioned vacuum until the liquid in said container covers said orifice.

10. Apparatus for controlling liquid flow into a container comprising means defining a first chamber, valve means movable in said first chamber between a closed position and an open position and normally urged toward closed position, means for moving said valve means to open position to permit liquid flow therethrough, means defining a second chamber, a flexible diaphragm connected to said second valve means, said diaphragm dividing said chamber into two compartments, means responsive to such liquid flow for applying a vacuum to one side of said diaphragm for holding said valve means in open position and including a first venturi in said first chamber, and a passage connected to said first venturi and to said second chamber on said one side of said diaphragm, and means responsive to such liquid flow for applying a vacuum to the opposite side of said diaphragm for substantially counterbalancing the holding effect of said first mentioned flow responsive means, said last mentioned flow responsive means including a second venturi in said first chamber and a passage connected to said second venturi and to said second chamber on said opposite side of said diaphragm and having an orifice positionable within such container and normally connected to atmosphere to permit air to spoil said second mentioned vacuum until the liquid in said container covers said orifice.

11. Apparatus for controlling liquid flow into a container comprising means defining a first chamber, valve means movable in said first chamber between a closed position and an open position, means for moving said valve means to open position to permit liquid flow therethrough, means defining a second chamber, a flexible diaphragm connected to said valve means, said diaphragm dividing said second chamber into two compartments, means responsive to such liquid flow for applying a vacuum to one of said compartments for holding said valve means in open position and including a first venturi in said first chamber and a passage connected to said first venturi and to said second chamber on said one side of said diaphragm, means responsive to such liquid flow for applying a vacuum to the other of said compartments for substantially counterbalancing the holding effect of said first mentioned flow responsive means, said last mentioned flow responsive means including a second venturi in said first chamber and a passage connected to said second venturi and to said second chamber on said opposite side of said diaphragm and having an orifice positionable within such container and normally connected to atmosphere to permit air to spoil said second mentioned vacuum until the liquid in said container covers said orifice, and means urging said valve means toward closed position.

12. The liquid flow control apparatus of claim 10 in combination with means defining a second orifice permitting air to spoil said first mentioned vacuum, said second orifice being closed by said diaphragm when said valve means is in open position and being opened by initial closing movement of said valve means.

13. The liquid flow control apparatus of claim 10 in combination with manually operable means for admitting air to said one side of said diaphragm.

14. Apparatus for controlling liquid flow into a container comprising a conduit, valve means within said conduit movable between a closed position and an open position and normally urged toward closed position, means for moving said valve means to open position to permit liquid flow through said conduit, means on the outlet end of said conduit for detachable connection of said conduit to a port in such container, said connection being liquid tight whereby such connection may be below liquid level in the container, pressure responsive means connected to said valve means, means responsive to liquid flow through said conduit for applying a vacuum to one side of said pressure responsive means for holding said valve means in open position, and means responsive to such liquid flow for applying a vacuum to the opposite side of said pressure responsive means for substantially counterbalancing the holding effect of said first mentioned flow responsive means, said last mentioned flow responsive means including a tube opening at one end to said other side of said presusre responsive means, opening at its other end to such liquid flow whereby such flow may produce said second mentioned vacuum, and having an intermediate portion outside said conduit, said intermediate portion having an orifice positionable within such container and normally connected to atmosphere to permit air to spoil said second mentioned vacuum until the liquid in said container covers said orifice.

15. Apparatus for controlling liquid flow into a container comprising a valve casing having a port therein, a valve in said casing movable between open and closed positions relatively to said port and normally urged toward closed position, means for moving said valve to open position, holding means energized by the flow of liquid through said port for creating a vacuum exerting a force on said valve for holding it in open position solely by such vacuum and including a chamber in said valve casing, a first venturi in said valve casing and a passage connected to said first venturi and to said chamber on one side of said valve, releasing means energized by the flow of liquid through said port for creating a vacuum to exert a force on said valve opposite the first named force for releasing said valve for movement toward closed position and including a second venturi in said valve casing and a passage connected to said second venturi and to said chamber on the other side of said valve, and means including a spoiler orifice connected to said releasing means for spoiling the vacuum created by said releasing means, except when said orifice is closed.

16. Apparatus for controlling liquid flow into a container comprising a valve casing having a port therein, a valve in said casing movable between open and closed positions relatively to said port, means for moving said valve to open position, holding means energized by the flow of liquid through said port for creating a vacuum exerting a force on said valve for holding it in open position solely by such vacuum and including a chamber in said valve casing, a first venturi in said valve casing and a passage connected to said first venturi and to said chamber on one side of said valve, means for moving said valve toward closed position including releasing means energized by the flow of liquid through said port for creating a vacuum whereby a force is exerted on said valve opposite the first named force for causing said valve to be moved toward closed position and including a second venturi in said valve casing and a passage connected to said second venturi and to said chamber on the other side of said valve, and means including a spoiler orifice connected to said releasing means for spoiling the vacuum created by said releasing means, except when said orifice is closed.

17. Apparatus for controlling liquid flow into a container comprising a conduit having a port therein, a chamber, a valve assembly in said conduit and including a valve movable between open and closed positions relatively to the port and normally urged toward closed position and an imperforate wall element dividing the chamber into two compartments, means for moving said valve assembly to open position, means including a first venturi in said conduit and a passage connected to said first venturi and to one of said compartments for creating a vacuum on a first face of said wall element by the flow of liquid through said conduit for holding the valve in open position solely by such vacuum, and a second venturi in said conduit and a passage connected to said second venturi and to the other of said compartments for creating a vacuum on the second face of the wall element by the flow of liquid through said conduit for substantially counterbalancing the vacuum on the first face to permit the valve to close, said second passage having a spoiler orifice opening therefrom for venting the second passage to the exterior of said conduit and preventing the creation of vacuum on such second face, except when such orifice is closed.

18. A filling nozzle for liquids comprising a valve casing having a port therein, a discharge tube leading from said valve casing, a valve assembly in said valve casing including a valve-actuating element and a valve movable between open and closed positions of said valve relatively to said port and normally urged toward closed position, means for moving said valve assembly to open position, means including a first venturi in said valve casing and a passage leading from said first venturi to a first face of said valve-actuating element for creating a vacuum thereon upon the flow of liquid through said casing for holding said assembly in open position solely by said vacuum, and means for releasing said valve for movement toward closed position including a second venturi in said valve casing and a passage leading from said second venturi to the other face of said valve-actuating element for creating a vacuum thereon upon the flow of liquid through said casing opposing said first vacuum, said second passage having a normally open spoiler orifice intermediate the ends thereof and opening exteriorly of said discharge tube for preventing the creation of vacuum in said second passage, except when said orifice is closed.

References Cited in the file of this patent

UNITED STATES PATENTS

| 2,686,626 | Slattery | Aug. 17, 1954 |
| 2,787,294 | Carriol | Apr. 2, 1957 |

FOREIGN PATENTS

| 510,281 | Great Britain | July 31, 1939 |